United States Patent
Ohfuku

(10) Patent No.: US 10,803,824 B2
(45) Date of Patent: Oct. 13, 2020

(54) DRIVING CIRCUIT FOR NON-RECTANGULAR DISPLAY UNIT

(71) Applicant: Sharp Kabushiki Kaisha, Sakai, Osaka (JP)

(72) Inventor: Kazuki Ohfuku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/604,175

(22) PCT Filed: Apr. 4, 2018

(86) PCT No.: PCT/JP2018/014357
§ 371 (c)(1),
(2) Date: Oct. 10, 2019

(87) PCT Pub. No.: WO2018/190206
PCT Pub. Date: Oct. 18, 2018

(65) Prior Publication Data
US 2020/0051519 A1    Feb. 13, 2020

(30) Foreign Application Priority Data

Apr. 11, 2017   (JP) .................................. 2017-078208

(51) Int. Cl.
*G09G 3/36*     (2006.01)
*G02F 1/1345*   (2006.01)

(52) U.S. Cl.
CPC .......... *G09G 3/3677* (2013.01); *G02F 1/1345* (2013.01); *G09G 3/3688* (2013.01);
(Continued)

(58) Field of Classification Search
CPC .. G09G 3/3677; G09G 3/3688; G09G 3/3644; G09G 3/3666; G09G 3/3275;
(Continued)

(56) References Cited

U.S. PATENT DOCUMENTS 10,339,875 B2 * 7/2019 Lee ...................... G09G 3/3291
2008/0018557 A1 * 1/2008 Maeda .................... G02F 1/167
345/55

(Continued)

FOREIGN PATENT DOCUMENTS

| JP | 02-216120 A | 8/1990 | |
| KR | 1020110065823 A * | 6/2011 | ............. G02F 1/133 |
| WO | 2017/221844 A1 | 12/2017 | |

OTHER PUBLICATIONS

Official Communication issued in International Patent Application No. PCT/JP2018/014357, dated Jul. 10, 2018.

*Primary Examiner* — Laurence J Lee
(74) *Attorney, Agent, or Firm* — Keating & Bennett, LLP

(57) ABSTRACT

In a display device including a non-rectangular display unit in which a plurality of gate bus lines and a plurality of source bus lines are arranged as signal lines, at least one of the gate bus lines and the source bus lines are driven by a first-type drive circuit unit as a circuit portion configured to drive such signal lines from only one end side, and a second-type drive circuit unit as a pair of circuit portions configured to drive the signal lines from both of one end side and the other end side.

9 Claims, 11 Drawing Sheets

(52) U.S. Cl.
 CPC . *G02F 2201/56* (2013.01); *G09G 2310/0221* (2013.01); *G09G 2310/0232* (2013.01); *G09G 2310/0283* (2013.01); *G09G 2310/06* (2013.01)

(58) Field of Classification Search
 CPC ... G09G 2310/0221; G09G 2310/0232; G09G 2310/0283; G09G 2310/0281; G02F 1/1362; G02F 2201/56
 See application file for complete search history.

(56) References Cited

U.S. PATENT DOCUMENTS

| | | | |
|---|---|---|---|
| 2009/0189835 A1* | 7/2009 | Kim | G09G 3/3677 345/80 |
| 2014/0253419 A1* | 9/2014 | Tanada | G09G 3/20 345/55 |
| 2017/0249906 A1* | 8/2017 | Noh | G09G 3/3266 |
| 2019/0025660 A1* | 1/2019 | Shimoshikiryoh | G02F 1/1368 |

* cited by examiner

US 10,803,824 B2

DRIVING CIRCUIT FOR NON-RECTANGULAR DISPLAY UNIT

This application is based upon and claims the benefit of priority from Japanese Patent Application No. 2017-78208 entitled "Display Device" filed on Apr. 11, 2017, the contents of which are incorporated herein by reference.

TECHNICAL FIELD

The present invention relates to a display device, and more specifically, relates to a display device including a display unit having a shape other than a rectangular shape.

BACKGROUND ART

A liquid crystal display device generally includes a liquid crystal panel formed of two insulating glass substrates facing each other. One of the glass substrates is called an array substrate, and the other of the glass substrates is called a counter substrate. Thin film transistors (TFT), pixel electrodes and the like are formed on the array substrate, and a common electrode (counter electrode), a color filter and the like are formed on the counter substrate. A plurality of source bus lines (video signal lines) and a plurality of gate bus lines (scanning signal lines) are arranged in a display unit (display region) in the liquid crystal panel. Pixel formation portions which form pixels are provided in the vicinities of intersections of the source bus lines and the gate bus lines. Each pixel formation portion includes a thin film transistor (TFT) which is a switching element connected at its gate terminal to a gate bus line passing through a corresponding intersection and connected at its source terminal to a source bus line passing through the intersection, a pixel capacitance for holding a pixel voltage value, and the like. Moreover, the liquid crystal display device includes a gate driver (scanning signal line drive circuit) that drives the gate bus lines, and a source driver (video signal line drive circuit) that drives the source bus lines. In such a configuration as described above, the gate bus lines are driven by the gate driver, and the source bus lines are driven by the source driver, whereby the pixel capacitances are charged, and a desired image is displayed on the display unit. Note that, in the drawings to be described below, it is assumed that the gate bus lines extend in a lateral direction of the drawings, and that the source bus lines extend in a longitudinal direction of the drawings.

FIG. 12 is a view for describing an example of a relationship between a display unit and a gate driver in a conventional general liquid crystal display device. As illustrated in FIG. 12, in the conventional general liquid crystal display device, a rectangular display unit 100 is provided in a rectangular liquid crystal panel 19. In the example illustrated in FIG. 12, the gate driver is constituted of three ICs (hereinafter, referred to as "gate driver ICs") 61 to 63. Note that, hereinafter, the plurality of gate driver ICs as described above are distinguished by reference numerals (the same also applies to source driver ICs). The gate driver IC 61 drives gate bus lines arranged in a region denoted by reference numeral 11 (hereinafter, referred to as "first display region" for convenience) within a region in the display unit 100. The gate driver IC 62 drives gate bus lines arranged in a region denoted by reference numeral 12 (hereinafter, referred to as "second display region" for convenience) within a region in the display unit 100. The gate driver IC 63 drives gate bus lines arranged in a region denoted by reference numeral 13 (hereinafter, referred to as "third display region" for convenience) in a region within the display unit 100. In such a way, the plurality of gate driver ICs individually drive the gate bus lines arranged in the display regions corresponding thereto.

Note that a chip-on-glass (COG) method, a chip-on-film (COF) method or the like is adopted as a method for mounting the gate driver ICs 61 to 63. Moreover, though the case where the gate driver ICs are used is described herein as an example, monolithically mounted gate drivers (that is, gate drivers directly formed on a glass substrate that constitutes a liquid crystal panel) is used in some cases.

Incidentally, a time constant in a circuit including the gate bus lines increases as the device increases in size, and resolution thereof increases. When the time constant increases, rounding of the waveform of each of the scanning signals to be transmitted by the gate bus lines increases. Accordingly, in order to prevent the rounding of the waveform of the scanning signal from increasing, a configuration in which the gate bus lines are driven from both of one end side and the other end side as illustrated in FIG. 13 is often adopted. In the example illustrated in FIG. 13, the gate driver is constituted of: gate driver ICs 64a and 64b which respectively drive, from one end side and the other end side, the gate bus lines arranged in the first display region 11; gate driver ICs 65a and 65b which respectively drive, from one end side and the other end side, the gate bus lines arranged in the second display region 12; and gate driver ICs 66a and 66b which respectively drive, from one end side and the other end side, the gate bus lines arranged in the third display region 13. With such a configuration, the respective gate bus lines are driven from both of one end side and the other end side. Accordingly, even if the time constant of the circuit increases, the rounding of the waveform of the scanning signal is prevented from increasing.

Note that a method for driving the gate bus lines from one end side as in the configuration illustrated in FIG. 12 is referred to as "gate one-side drive", and that a method for driving the gate bus lines from both of one end side and the other end side as in the configuration illustrated in FIG. 13 is referred to as "gate both-side drive".

Also regarding the drive of the source bus lines, there are a case where "source one-side drive" in which the source bus lines are driven from one end side is adopted, and a case where "source both-side drive" in which the source bus lines are driven from both of one end side and the other end side is adopted. The source both-side drive is adopted in order to prevent rounding of a waveform of each of video signals from increasing. FIG. 14 is a view for describing an example of a relationship between the display unit and the source driver in a case in which the source one-side drive is adopted. Moreover, FIG. 15 is a view for describing an example of a relationship between the display unit and the source driver in a case in which the source both-side drive is adopted. Note that, in these examples, a region denoted by reference numeral 14 is referred to as "first display region", a region denoted by reference numeral 15 is referred to as "second display region", and a region denoted by reference numeral 16 is referred to as "third display region". In the example illustrated in FIG. 14, the source driver is constituted of: a source driver IC 71 that drives, from one end side, the source bus lines arranged in the first display region 14; a source driver IC 72 that drives, from one end side, the source bus lines arranged in the second display region 15; and a source driver IC 73 that drives, from one end side, the source bus lines arranged in the third display region 16. In the example illustrated in FIG. 15, the source driver is constituted of: source driver ICs 74a and 74b which respectively drive, from one end side and the other end side, the source bus lines arranged in the first display region 14; source driver ICs 75a and 75b which respectively drive, from one end side and the other end side, the source bus lines arranged in the second display region 15; and source driver ICs 76a and 76b which respectively drive, from one end side and the other end side, the source bus lines arranged in the third display region 16.

Note that the following prior art documents are known in relation to the present invention. Japanese Laid-Open Patent Publication No. H2-216120 discloses: a configuration that adopts the gate one-side drive and the source one-side drive; a configuration that adopts the gate both-side drive and the source one-side drive; a configuration that adopts the gate one-side drive and the source both-side drive; and a configuration that adopts the gate both-side drive and the source both-side drive.

PRIOR ART DOCUMENT

Patent Document

[Patent Document 1] Japanese Laid-Open Patent Publication No. H2-216120

SUMMARY OF THE INVENTION

Problems to be Solved by the Invention

In recent years, development of a liquid crystal display device provided with a display unit having a shape other than a rectangular shape has been advanced, such as a liquid crystal display device for use in a timepiece and an in-vehicle liquid crystal display device. The display device as described above is called "oddly shaped display". In the oddly shaped display, a length of the gate bus lines varies depending on places. Accordingly, whether the gate one-side drive is adopted or the gate both-side drive is adopted is determined, for example, in consideration of a magnitude of a time constant in a region where the longest gate bus line is arranged. Note that the magnitude of the time constant depends on a length of the gate bus lines and resolution. Likewise, whether the source one-side drive is adopted or the source both-side drive is adopted is determined, for example, in consideration of a magnitude of a time constant in a region where the longest source bus line is arranged.

FIG. 16 is a view for describing an example of a relationship between the display unit and the gate driver in a case in which the gate both-side drive is adopted in a conventional oddly shaped display having a circular display unit. Moreover, FIG. 17 is a view for describing an example of a relationship between the display unit and the source driver in a case in which the source both-side drive is adopted in the conventional oddly shaped display having the circular display unit. In the example illustrated in FIG. 16, the gate driver is constituted of: gate driver ICs 81a and 81b which respectively drive, from one end side and the other end side, the gate bus lines arranged in the first display region 11; gate driver ICs 82a and 82b which respectively drive, from one end side and the other end side, the gate bus lines arranged in the second display region 12; and gate driver ICs 83a and 83b which respectively drive, from one end side and the other end side, the gate bus lines arranged in the third display region 13. In the example illustrated in FIG. 17, the source driver is constituted of: source driver ICs 91a and 91b which respectively drive, from one end side and the other end side, the source bus lines arranged in the first display region 14; source driver ICs 92a and 92b which respectively drive, from one end side and the other end side, the source bus lines arranged in the second display region 15; and source driver ICs 93a and 93b which respectively drive, from one end side and the other end side, the source bus lines arranged in the third display region 16. With such a configuration as described above, in the oddly shaped display, rounding of waveforms of drive signals (scanning signals to be transmitted by the gate bus lines and video signals to be transmitted by the source bus lines) is prevented from increasing.

However, in a case where the both-side drives (gate both-side drive and source both-side drive) are adopted, cost increases since the number of drivers (for example, the number of ICs) increases as compared with a case where the one-side drives (gate one-side drive and source one-side drive) are adopted. Meanwhile, regarding the display device such as a liquid crystal display device, price reduction thereof is strongly desired.

Accordingly, an object of the following disclosure is to achieve cost reduction while preventing the rounding of the waveform of the drive signal from increasing, regarding the oddly shaped display.

Means for Solving the Problems

A display device according to some embodiments includes: a non-rectangular display unit in which a plurality of scanning signal lines and a plurality of video signal lines are arranged as signal lines; a scanning signal line drive circuit configured to drive the plurality of scanning signal lines; and a video signal line drive circuit configured to drive the plurality of video signal lines, wherein at least one of the scanning signal line drive circuit and the video signal line drive circuit is constituted of a first-type drive circuit unit as a circuit portion configured to drive the signal lines from only one end side, and a second-type drive circuit unit as a pair of circuit portions configured to drive the signal lines from both of one end side and the other end side.

Effects of the Invention

At least one of the scanning signal line drive circuit and the video signal line drive circuit is constituted of the first-type drive circuit unit as the circuit portion configured to drive the signal lines from only one end side, and the second-type drive circuit unit as the pair of circuit portions configured to drive the signal lines from both of one end side and the other end side. Therefore, the number of required drivers is reduced in comparison with a configuration of driving all the scanning signal lines or all the video signal lines or both thereof from both of one end side and the other end side. Thus, cost is reduced. Moreover, while a length of the signal lines varies depending on places since the shape of the display unit is non-rectangular, relatively long signal lines are driven by the second-type drive circuit unit, whereby rounding of the waveform of each of the drive signals is prevented from increasing. From the above, regarding the oddly shaped display, the cost reduction is achieved while preventing the rounding of the waveform of the drive signal from increasing.

MODES FOR CARRYING OUT THE INVENTION

Embodiments will be described below with reference to the accompanying drawings.

<1. First Embodiment>
<1.1 Functional Configuration and Operation Outline>

Figure 2:
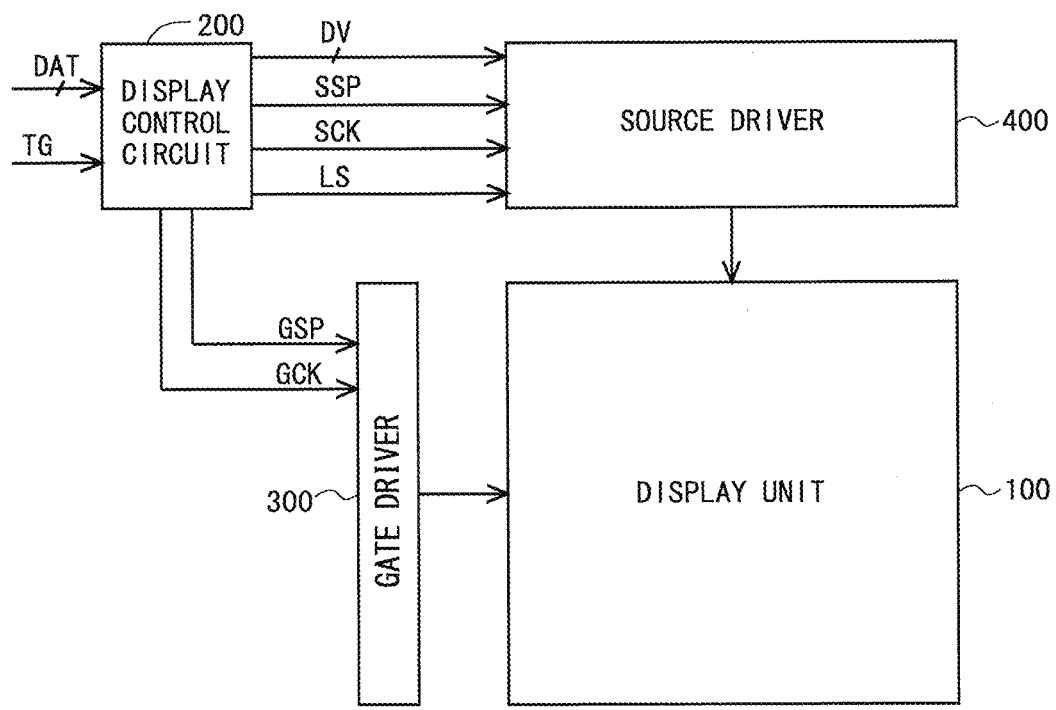
FIG. 2 is a block diagram illustrating a functional configuration of a liquid crystal display device in the first embodiment.

FIG. 2 is a block diagram illustrating a functional configuration of a liquid crystal display device according to a first embodiment. Since FIG. 2 is a diagram illustrating the functional configuration, shapes of respective constituents and a positional relationship between the constituents, and the like are different from actual ones. As illustrated in FIG. 2, this liquid crystal display device includes a display unit 100, a display control circuit 200, a gate driver 300 and a source driver 400.

Figure 3:
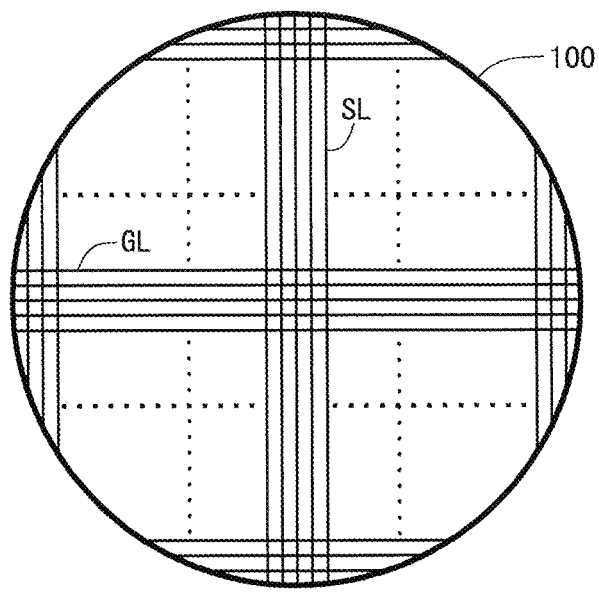
FIG. 3 is a view for describing the display unit in the first embodiment.
Figure 4:
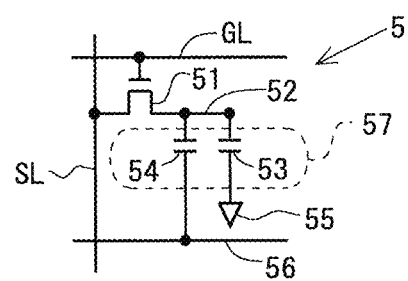
FIG. 4 is a circuit diagram illustrating a configuration of a pixel formation portion in the first embodiment.

In this embodiment, the display unit 100 has a circular shape as illustrated in FIG. 3. A plurality of gate bus lines (scanning signal lines) GL and a plurality of source bus lines (video signal lines) SL are arranged in the display unit 100. Pixel formation portions which form pixels are provided in the vicinities of intersections of the gate bus lines GL and the source bus lines SL. FIG. 4 is a circuit diagram illustrating a configuration of a pixel formation portion 5. The pixel formation portion 5 includes: a thin film transistor (TFT) 51 in which a gate electrode is connected to the gate bus line GL passing through the corresponding intersection and a source electrode is connected to the source bus line SL passing through the intersection; a pixel electrode 52 connected to a drain electrode of the TFT 51; a common electrode 55 and an auxiliary capacitance electrode 56 which are commonly provided to a plurality of the pixel formation portions 5 in the display unit 100; a liquid crystal capacitance 53 formed of the pixel electrode 52 and the common electrode 55; and an auxiliary capacitance 54 formed of the pixel electrode 52 and the auxiliary capacitance electrode 56. The liquid crystal capacitance 53 and the auxiliary capacitance 54 constitute a pixel capacitance 57. Note that the configuration of the pixel formation portion 5 is not limited to the configuration illustrated in FIG. 4. For example, a configuration in which the auxiliary capacitance 54 and the auxiliary capacitance electrode 56 are not provided can also be adopted.

A type of the TFT 51 in the display unit 100 is not particularly limited. For example, an amorphous silicon TFT, a low temperature poly silicon (LTPS)-TFT, an oxide TFT (TFT using an oxide semiconductor for a channel layer) or the like can be adopted as the TFT 51 in the display unit 100. As the oxide TFT, for example, there can be adopted a TFT in which a channel layer is formed of indium gallium zinc oxide (I—Ga—Zn—O) that is an oxide semiconductor containing indium (In), gallium (Ga), zinc (Zn) and oxygen (O) as main components.

Next, operations of the constituents illustrated in FIG. 2 will be described. The display control circuit 200 receives an image signal DAT and a timing signal group TG such as a horizontal synchronization signal and a vertical synchronization signal, which are sent from an external source, and outputs a digital video signal DV, a gate start pulse signal GSP and a gate clock signal GCK for controlling an operation of the gate driver 300, and a source start pulse signal SSP, a source clock signal SCK and a latch strobe signal LS for controlling an operation of the source driver 400.

The gate driver 300 repeats application of an active scanning signal to each of the gate bus lines GL with a vertical scanning period as a cycle based on the gate start pulse signal GSP and the gate clock signal GCK, which are sent from the display control circuit 200.

The source driver 400 receives the digital video signal DV, the source start pulse signal SSP, the source clock signal SCK and the latch strobe signal LS, which are sent from the display control circuit 200, and applies driving video signals to the source bus lines SL. At this time, the source driver 400 sequentially holds the digital video signals DV, which indicate voltages to be applied to the respective source bus lines SL, at pieces of timing when pulses of the source clock signal SCK are generated. Then, the held digital video signals DV are converted to analog voltages at a timing when a pulse of the latch strobe signal LS is generated. The converted analog voltages are simultaneously applied as the driving video signals to all the source bus lines SL.

As described above, the scanning signals are applied to the gate bus lines GL, and the driving video signals are applied to the source bus lines SL, whereby an image corresponding to the image signal DAT sent from the external source is displayed on the display unit 100.

<1.2 Relationship Between Display Unit and Gate Driver>

Figure 1:
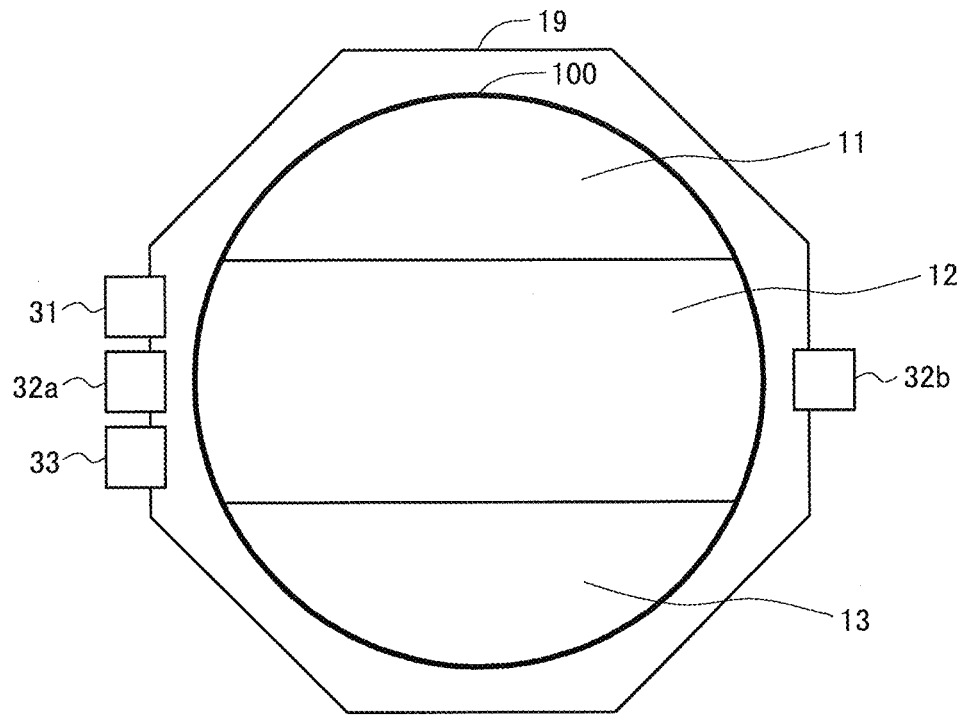
FIG. 1 is a view for describing a relationship between a display unit and a gate driver in a first embodiment.

Next, a relationship between the display unit 100 and the gate driver 300 will be described with reference to FIG. 1. As illustrated in FIG. 1, a region in the display unit 100 is logically divided into three regions (first display region 11 to third display region 13). In other words, the region in the display unit 100 is logically divided into a central region (second display region 12), which includes a center of the display unit 100, and two peripheral regions (first display region 11 and third display region 13), which sandwich the central region therebetween, in a direction perpendicular to a direction where the gate bus lines GL extend. The gate driver 300 is constituted of four gate driver ICs 31, 32*a*, 32*b* and 33. The COG method, the COF method or the like is adopted as a method for mounting these four gate driver ICs 31, 32*a*, 32*b* and 33.

In such a configuration, the gate driver IC 31 is configured to drive the gate bus lines GL arranged in the first display region 11, the gate driver IC 32*a* and the gate driver IC 32*b* are configured to drive the gate bus lines GL arranged in the second display region 12, and the gate driver IC 33 is configured to drive the gate bus lines GL arranged in the third display region 13. That is, the gate bus lines GL arranged in the first display region 11 (peripheral region) are driven from one end side by the gate driver IC 31, the gate bus lines GL arranged in the second display region 12 (central region) are driven from both of one end side and the other end side by the gate driver IC 32*a* and the gate driver IC 32*b*, and the gate bus lines GL arranged in the third display region 13 (peripheral region) are driven from one end side by the gate driver IC 33.

Herein, a circuit portion configured to drive signal lines from only one end side is defined as "first-type drive circuit unit", and a pair of circuit portions configured to drive signal lines from both of one end side and the other end side is defined as "second-type drive circuit unit". Then, the gate driver IC 31 and the gate driver IC 33 are first-type drive circuit units. Moreover, the gate driver IC 32*a* and the gate driver IC 32*b* constitute one second-type drive circuit unit. As described above, in this embodiment, the gate driver 300 is constituted of the first-type drive circuit units and the second-type drive circuit unit.

Figure 5:
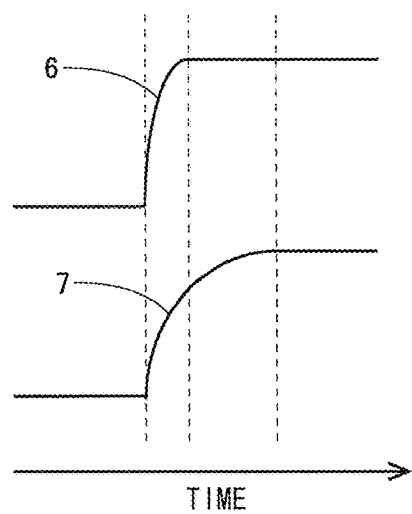
FIG. 5 is a diagram for describing rounding of a waveform of a scanning signal.

Incidentally, a time constant of the circuit including the gate bus lines GL depends on a length of the gate bus lines GL as mentioned above. Moreover, rounding of a waveform of each of the scanning signals increases as the time constant is larger. Hence, as the length of the gate bus lines GL is longer, the rounding of the waveform of each of the scanning signals to be transmitted by the gate bus lines GL increases. Herein, when attention is paid to rises of the scanning signals, if all the gate bus lines GL are driven by the above-mentioned first-type drive circuit unit, then in a gate bus line GL arranged in the first display region 11 or the third display region 13, a waveform of a scanning signal rounds like a portion denoted by reference numeral 6 in FIG. 5, and meanwhile, in a gate bus line GL arranged in the second display region 12, a waveform of a scanning signal rounds like a portion denoted by reference numeral 7 in FIG. 5. That is, the waveform of the scanning signal in the second display region 12 rounds more largely than that in the first display region 11 and the third display region 13.

Accordingly, as mentioned above, this embodiment adopts a configuration in which the gate bus lines GL arranged in the second display region 12 (central region) are driven by the second-type drive circuit unit (that is, a pair of circuit portions constituted of the gate driver IC 32*a* and the gate driver IC 32*b*. More specifically, whether each gate bus line GL is driven by the first-type drive circuit unit or by the second-type drive circuit unit (that is, which of the gate one-side drive and the gate both-side drive is to be adopted for each gate bus line GL) is determined as follows, and depending on a result of the determination, the region in the display unit 100 is logically divided into three regions (first display region 11 to third display region 13). Such gate bus lines GL arranged in a region where a value of the time constant is smaller than a predetermined reference value are driven by the first-type drive circuit unit, and such gate bus lines GL arranged in a region where a value of the time constant is larger than the reference value are driven by the second-type drive circuit unit. Note that the above may also be determined as follows. Gate bus lines GL each having a length shorter than a predetermined reference length are driven by the first-type drive circuit unit, and gate bus lines GL each having a length longer than the reference length are driven by the second-type drive circuit unit.

<1.3 Effect>

According to this embodiment, the gate driver 300 is constituted of: the first-type drive circuit units as the circuit portions configured to drive the gate bus lines GL from only one end side; and the second-type drive circuit unit as the pair of circuit portions configured to drive the gate bus lines GL from both of one end side and the other end side. That is, a part of the gate bus lines GL are subjected to the gate both-side drive, and the rest of the gate bus lines GL are subjected to the gate one-side drive. Therefore, in comparison with a configuration in which the gate both-side drive is performed for all the gate bus lines GL, the number of driver outputs can be reduced, and the number of required drivers (number of gate driver ICs) decreases, and therefore, cost is reduced. Moreover, while a circular shape is adopted as a shape of the display unit 100, the gate both-side drive is performed for the region (second display region 12) where relatively long gate bus lines GL are arranged, and therefore, the rounding of the waveform of the scanning signal is prevented from increasing. From the above, according to this embodiment, regarding the oddly shaped display, the cost reduction is achieved while preventing the rounding of the waveform of the scanning signal from increasing.

<2. Second Embodiment>

<2.1 Outline>

In the above-described first embodiment, the gate driver 300 is constituted of the first-type drive circuit units and the second-type drive circuit unit. In contrast, in this embodiment, the source driver 400 is constituted of first-type drive circuit units and a second-type drive circuit unit. Note that a functional configuration and an operation outline are similar to those in the above-described first embodiment, and accordingly, a description thereof will be omitted.

<2.2 Relationship Between Display Unit and Source Driver>

Figure 6:
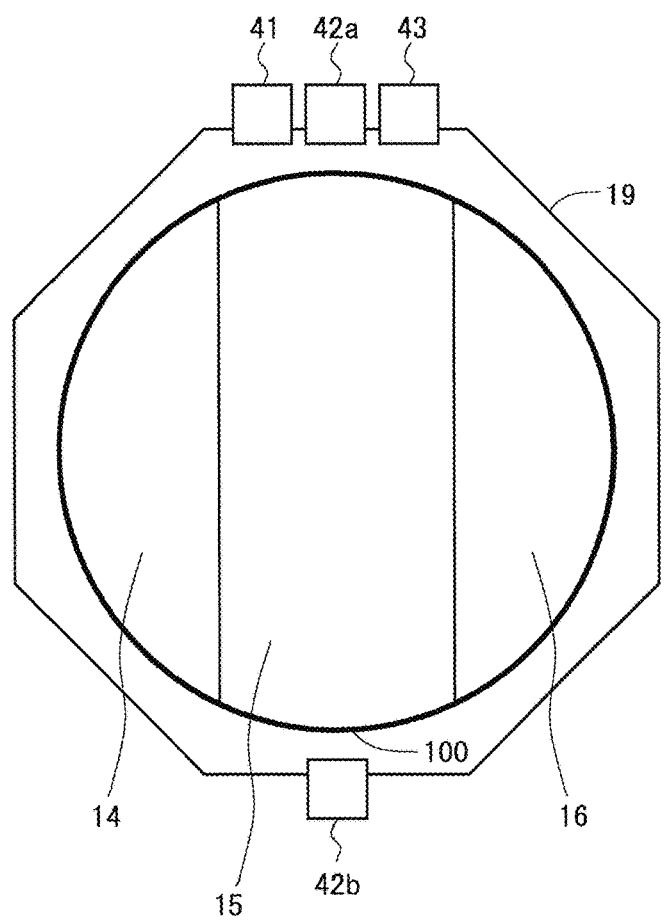
FIG. 6 is a view for describing a relationship between a display unit and a source driver in a second embodiment.

A relationship between a display unit 100 and a source driver 400 in this embodiment will be described with reference to FIG. 6. As illustrated in FIG. 6, a region in the display unit 100 is logically divided into three regions (first display region 14 to third display region 16). In other words, the region in the display unit 100 is logically divided into a central region (second display region 15), which includes a center of the display unit 100, and two peripheral regions (first display region 14 and third display region 16), which sandwich the central region therebetween, in a direction perpendicular to a direction where the source bus lines SL extend. The source driver 400 is constituted of four source driver ICs 41, 42*a*, 42*b* and 43. The COG method, the COF method or the like is adopted as a method for mounting these four source driver ICs 41, 42*a*, 42*b* and 43.

In such a configuration, the source driver IC 41 is configured to drive the source bus lines SL arranged in the first display region 14, the source driver IC 42*a* and the source driver IC 42*b* are configured to drive the source bus lines SL arranged in the second display region 15, and the source driver IC 43 is configured to drive the source bus lines SL arranged in the third display region 16. That is, the source bus lines SL arranged in the first display region 14 (peripheral region) are driven from one end side by the source driver IC 41, the source bus lines SL arranged in the second display region 15 (central region) are driven from both of one end side and the other end side by the source driver IC 42*a* and the source driver IC 42*b*, and the source bus lines SL arranged in the third display region 16 (peripheral region) are driven from one end side by the source driver IC 43.

As seen from the above, the source driver IC 41 and the source driver IC 43 are the first-type drive circuit units. Moreover, the source driver IC 42*a* and the source driver IC 42*b* constitute one second-type drive circuit unit.

Note that, like the above-described first embodiment, whether each source bus line SL is driven by the first-type drive circuit unit or by the second-type drive circuit unit may be determined, for example, by comparing a value of a time constant in a region where each source bus line SL is arranged with a predetermined reference value, or may be determined by comparing a length of each source bus line SL with a predetermined reference length.

<2.3 Effect>

According to this embodiment, the source driver 400 is constituted of: the first-type drive circuit units as the circuit portions configured to drive the source bus lines SL from only one end side; and the second-type drive circuit unit as the pair of circuit portions configured to drive the source bus lines SL from both of one end side and the other end side. That is, a part of the source bus lines SL are subjected to the source both-side drive, and the rest of the source bus lines SL are subjected to the source one-side drive. Therefore, in comparison with a configuration in which the source both-side drive is performed for all the source bus lines SL, the number of required drivers (number of source driver ICs) decreases, and therefore, cost is reduced. Moreover, while a circular shape is adopted as a shape of the display unit 100, the source both-side drive is performed for the region (second display region 15) where relatively long source bus lines SL are arranged, and therefore, the rounding of the waveform of the video signal is prevented from increasing. From the above, according to this embodiment, regarding the oddly shaped display, the cost reduction is achieved while preventing the rounding of the waveform of the video signal from increasing.

<3. Modified Example>

<3.1 First Modified Example>

Figure 7:
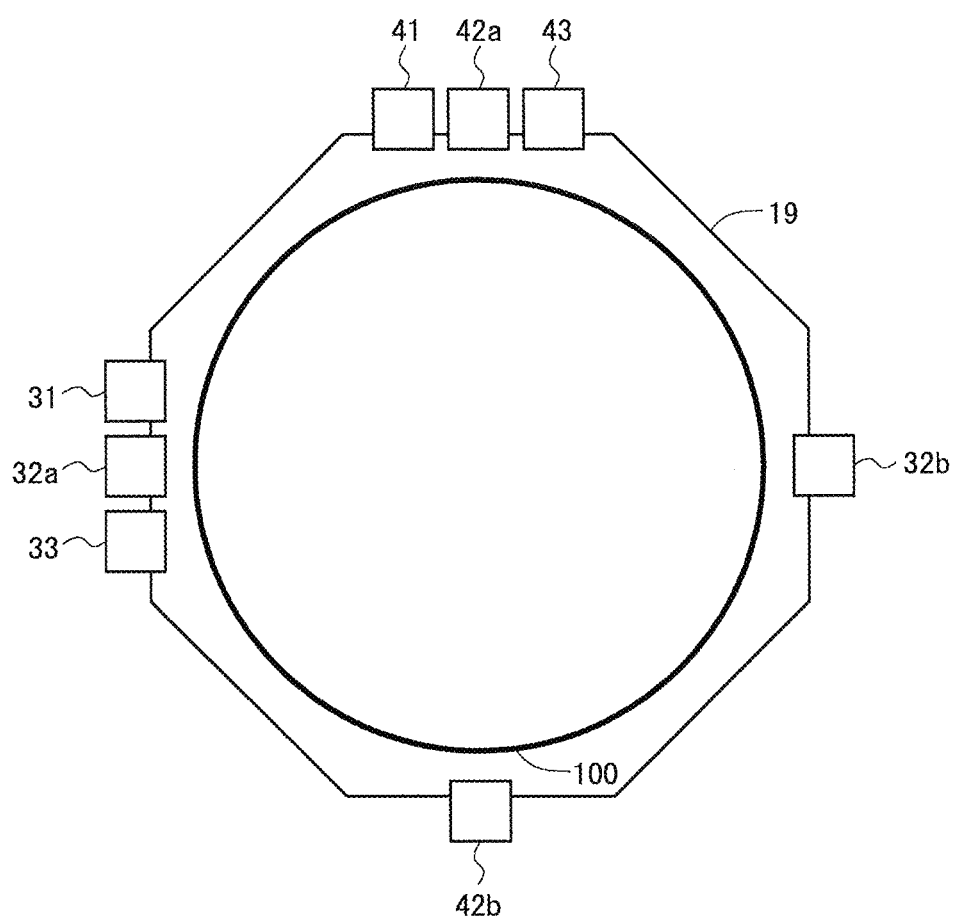
FIG. 7 is a view for describing a relationship between a display unit and a gate driver/source driver in a first modified example.

FIG. 7 is a view for describing a relationship between a display unit 100 and a gate driver 300/a source driver 400 in a modified example of the above-described respective embodiments. As seen from FIG. 1, FIG. 6 and FIG. 7, a configuration in this modified example is a configuration in which the configuration in the first embodiment and the configuration in the second embodiment are combined with each other. That is, each of the gate driver 300 and the source driver 400 is constituted of the first-type drive circuit units and the second-type drive circuit unit. By adopting such a configuration, regarding the oddly shaped display, the cost reduction is achieved while preventing the rounding of the waveforms of the scanning signal and the video signal from increasing.

<3.2 Second Modified Example>

Figure 8:
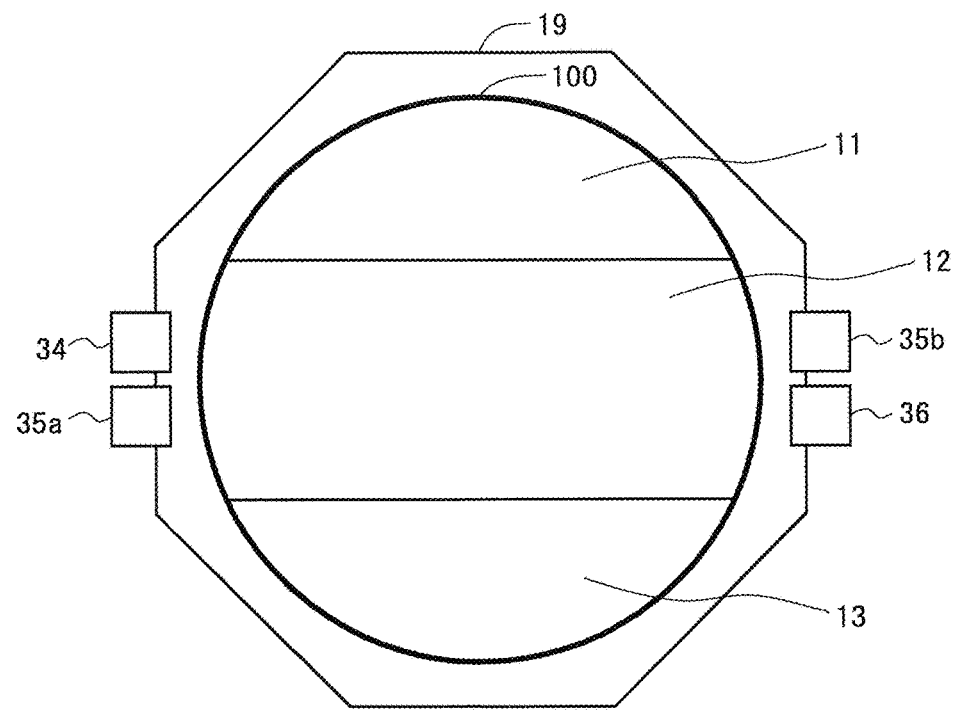
FIG. 8 is a view for describing a relationship between a display unit and a gate driver in a second modified example.

In the above-described first embodiment, the gate driver IC 31 configured to drive the gate bus lines GL arranged in the first display region 11 and the gate driver IC 33 configured to drive the gate bus lines GL arranged in the third display region 13 are arranged on the same side. However, as illustrated in FIG. 8, a configuration (configuration of this modified example) can be adopted in which a gate driver IC 34 configured to drive the gate bus lines GL arranged in the first display region 11 and a gate driver IC 36 configured to drive the gate bus lines GL arranged in the third display region 13 are arranged on different sides. Note that, in this modified example, the gate bus lines GL arranged in the second display region 12 are driven from both of one end side and the other end side by gate driver ICs 35*a* and 35*b*. A similar configuration can also be adopted for the source driver 400.

<3.3 Third Modified Example>

Figure 9:
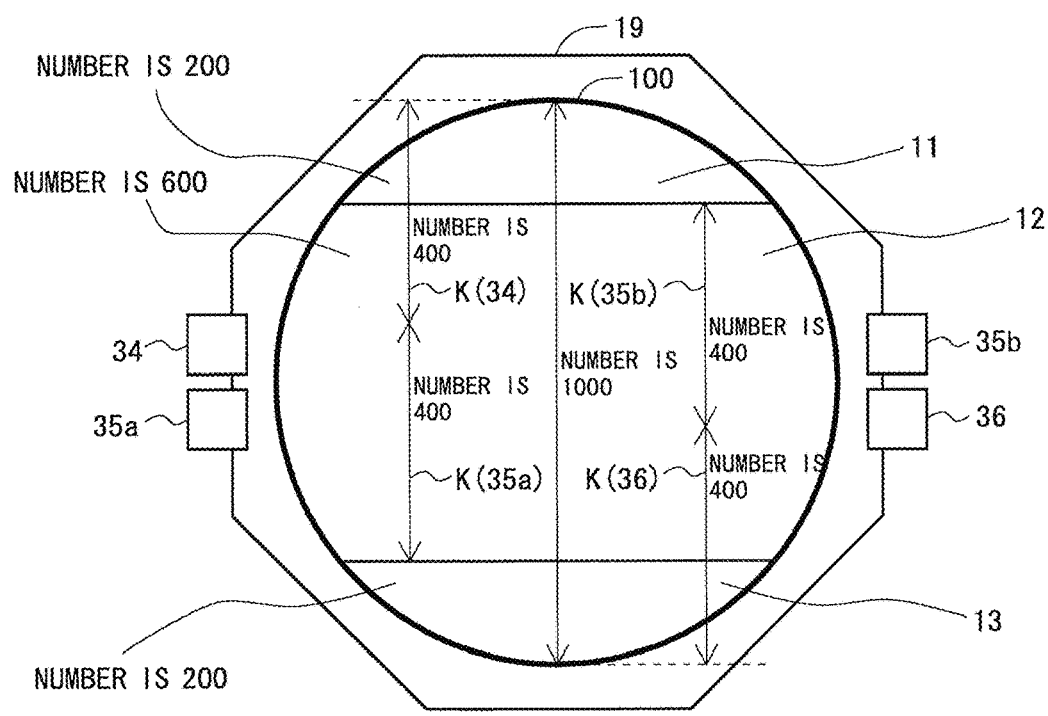
FIG. 9 is a view for describing gate bus lines to be driven by respective gate driver ICs in a third modified example.

In relation to such a configuration as illustrated in FIG. 8 (configuration of the second modified example), such a configuration (configuration of this modified example) may be adopted in which a plurality of gate bus lines GL to be driven by a certain gate driver IC include gate bus lines GL in a region where the gate one-side drive is performed and gate bus lines GL in a region where the gate both-side drive is performed. This will be described with reference to FIG. 9. Note that the total number of gate bus lines GL is assumed to be 1000, and that the number of outputs of each gate driver IC is assumed to be 400. At this time, 400 gate bus lines GL arranged in a region represented by an arrow denoted by reference character K(34) are driven by the gate driver IC 34, 400 gate bus lines GL arranged in a region represented by an arrow denoted by reference character K(35*a*) are driven by the gate driver IC 35*a*, 400 gate bus lines GL arranged in a region represented by an arrow denoted by reference character K(35*b*) are driven by the gate driver IC 35*b*, and 400 gate bus lines GL arranged in an arrow region denoted by reference character K(36) are driven by the gate driver IC 36. Thus, for example, a 100-th gate bus line GL from the top is driven from one end side by the gate driver IC 34, a 300-th gate bus line GL from the top is driven from both of one end side and the other end side by the gate driver IC 34 and the gate driver IC 35*b*, a 500-th gate bus line GL from the top is driven from both of one end side and the other end side by the gate driver IC 35*a* and the gate driver IC 35*b*, a 700-th gate bus line GL from the top is driven from both of one end side and the other end side by the gate driver IC 35*a* and the gate driver IC 36, and a 900-th gate bus line GL from the top is driven from one end side by the gate driver IC 36. In such a way, the gate bus lines GL arranged in the first display region 11 and the gate bus lines GL arranged in the third display region 13 are driven from one end side, and the gate bus lines GL arranged in the second display region 12 are driven from both of one end side and the other end side. In this configuration, a part of the gate driver IC 34, the gate driver IC 35*a*, the gate driver IC 35*b* and a part of the gate driver IC 36 constitute the second-type drive circuit unit, and a residual portion of the gate driver IC 34 and a residual portion of the gate driver IC 36 constitute the first-type drive circuit units. According to such a configuration, it becomes unnecessary to perform case division between the gate one-side drive and the gate both-side drive for each gate driver IC, and a degree of freedom in design is improved. A similar configuration can also be adopted for the source driver 400.

Note that, in this modified example, a first drive unit is achieved by the gate driver IC 34, a second drive unit is achieved by the gate driver IC 35*a*, a third drive unit is achieved by the gate driver IC 35*b*, and a fourth drive unit is achieved by the gate driver IC 36.

<3.4 Fourth modified example>

Figure 10:
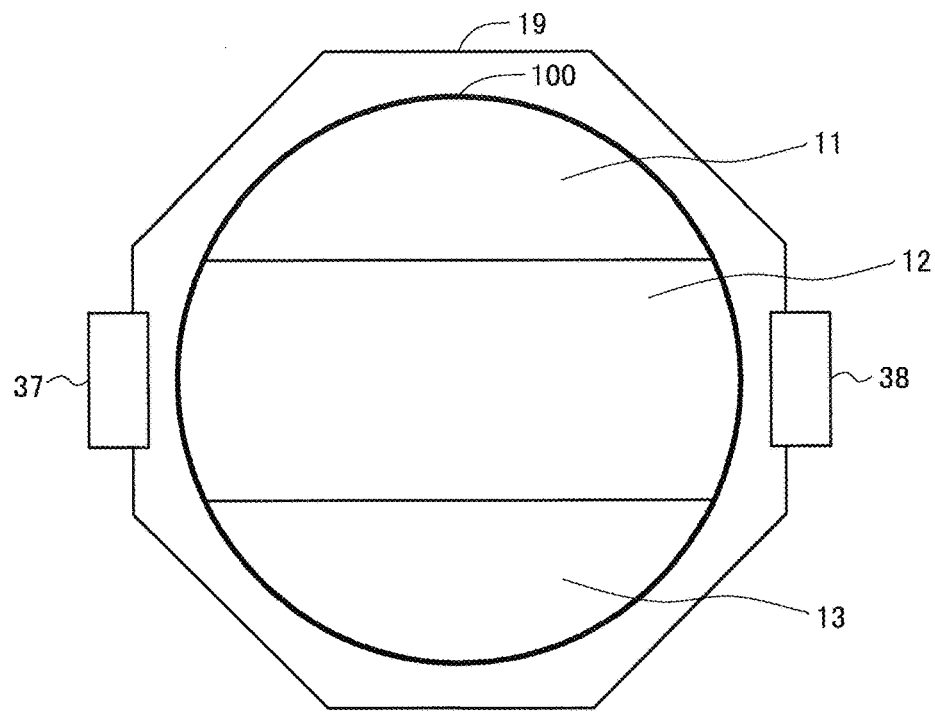
FIG. 10 is a view for describing a relationship between a display unit and a gate driver in a fourth modified example.
Figure 11:
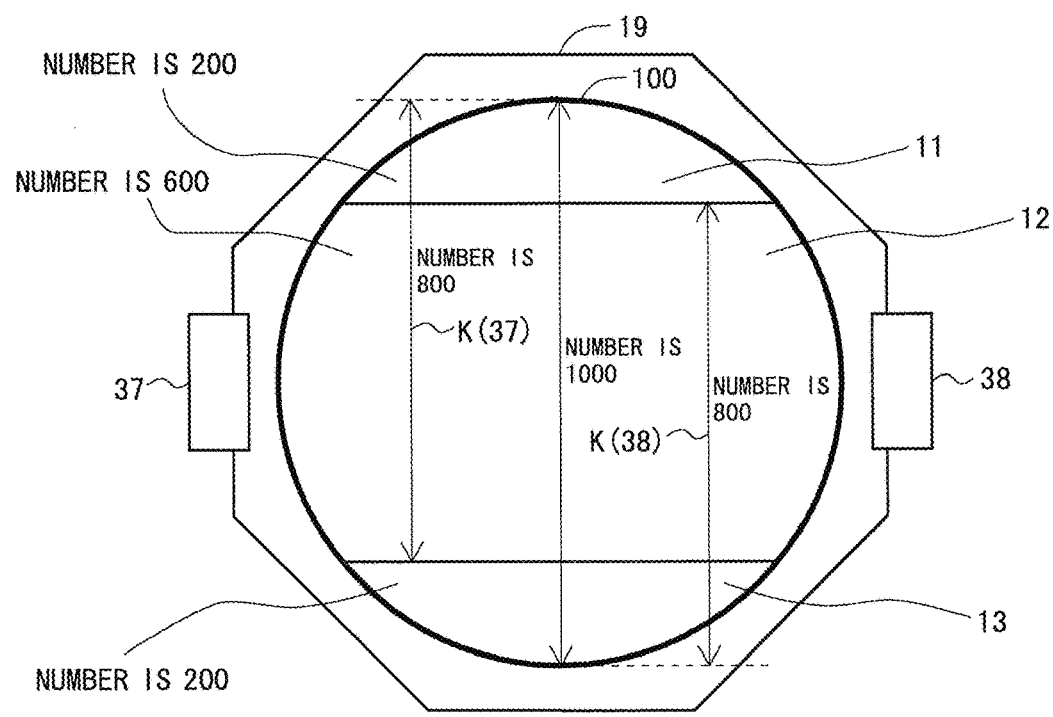
FIG. 11 is a view for describing gate bus lines to be driven by respective gate driver ICs in the fourth modified example.
Figure 12:
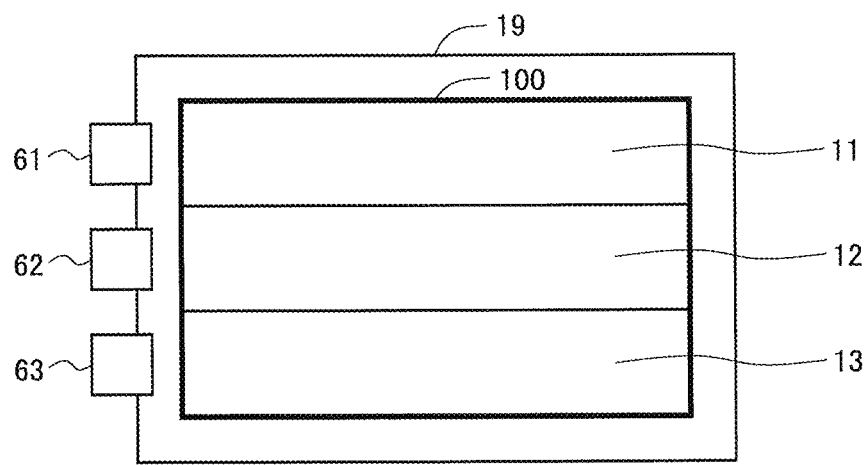
FIG. 12 is a view for describing an example of a relationship between a display unit and a gate driver in a conventional general liquid crystal display device.
Figure 13:
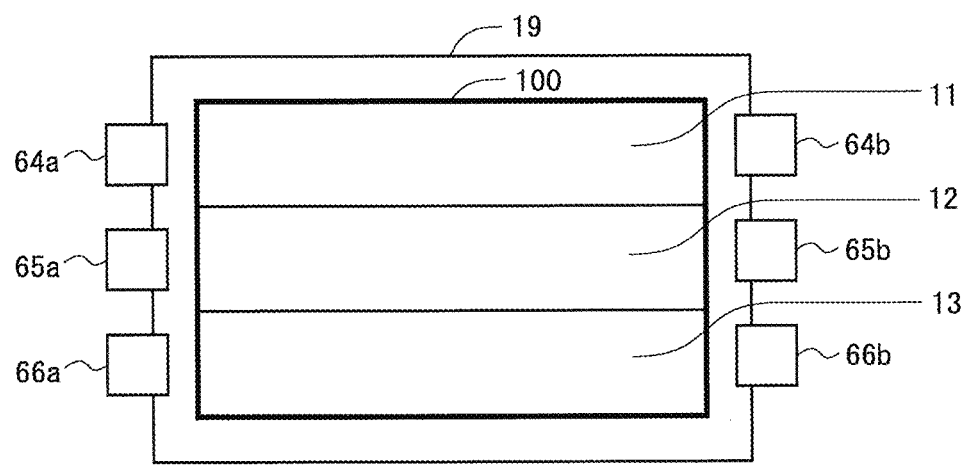
FIG. 13 is a view for describing another example of the relationship between the display unit and the gate driver in the conventional general liquid crystal display device.
Figure 14:
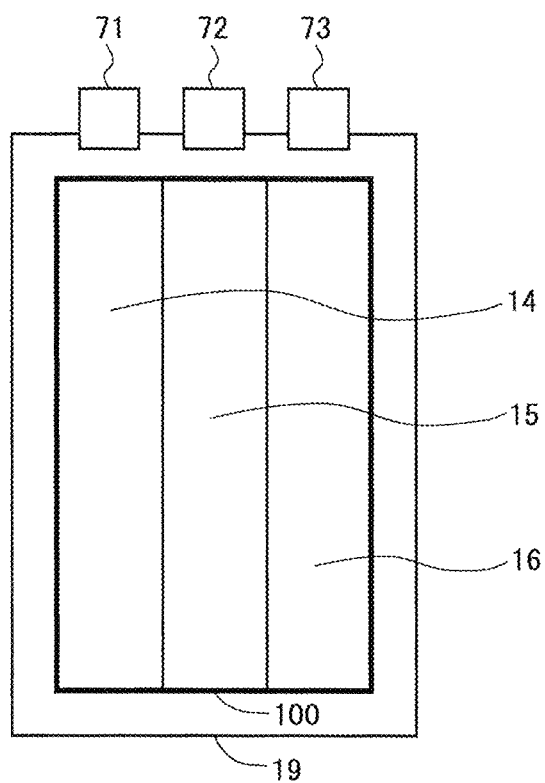
FIG. 14 is a view for describing an example of a relationship between the display unit and a source driver in the conventional general liquid crystal display device.
Figure 15:
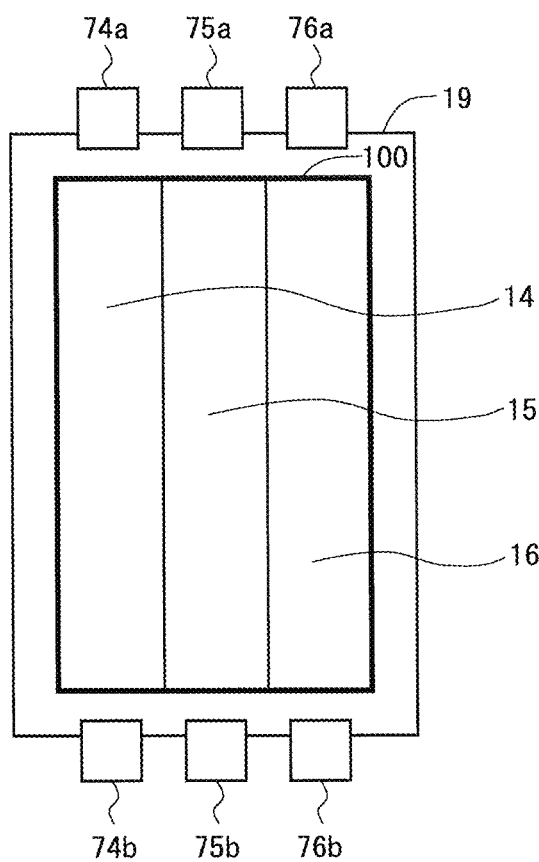
FIG. 15 is a view for describing another example of the relationship between the display unit and the source driver in the conventional general liquid crystal display device.
Figure 16:
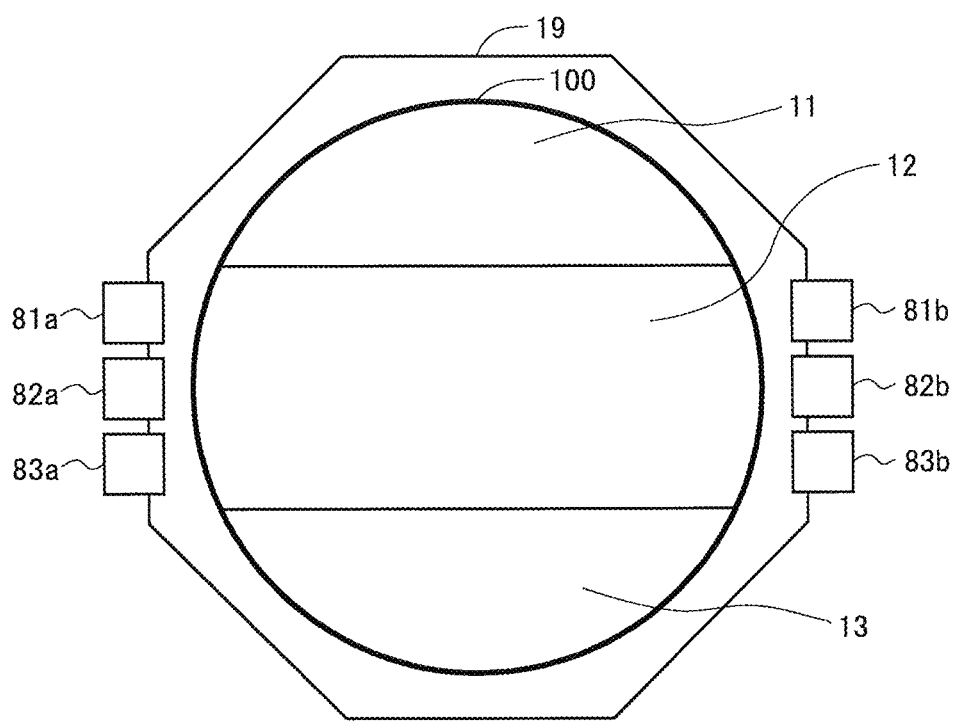
FIG. 16 is a view for describing an example of a relationship between a display unit and a gate driver in a case in which gate both-side drive is adopted in a conventional oddly shaped display having a circular display unit.
Figure 17:
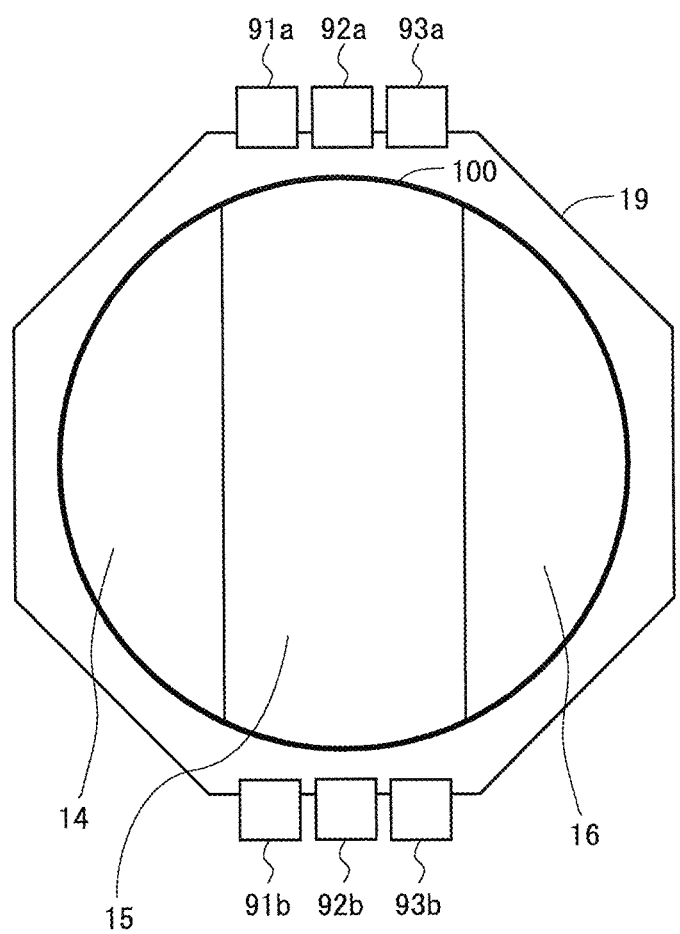
FIG. 17 is a view for describing an example of a relationship between the display unit and a source driver in a case in which source both-side drive is adopted in the conventional oddly shaped display having the circular display unit.

As illustrated in FIG. 10, a configuration (configuration of this modified example) can also be adopted in which a gate driver IC 37 formed by combining the gate driver ICs 34 and 35a illustrated in FIG. 8 into one is provided on one end side of the gate bus lines GL and a gate driver IC 38 formed by combining the gate driver ICs 35b and 36 illustrated in FIG. 8 into one is provided on the other end side of the gate bus lines GL. This configuration will be described with reference to FIG. 11. Note that the total number of gate bus lines GL is assumed to be 1000, and that the number of outputs of each gate driver IC is assumed to be 800. At this time, 800 gate bus lines GL arranged in a region represented by an arrow denoted by reference character K(37) are driven by the gate driver IC 37, and 800 gate bus lines GL arranged in a region represented by an arrow denoted by reference character K(38) are driven by the gate driver IC 38. In other words, 200 gate bus lines GL arranged in the first display region 11 are driven by the gate driver IC 37, 600 gate bus lines GL arranged in the second display region 12 are driven from one side by the gate driver IC 37 and are driven from the other end side by the gate driver IC 38, and 200 gate bus lines GL arranged in the third display region 13 are driven by the gate driver IC 38. Thus, for example, a 100-th gate bus line GL from the top is driven from one end side by the gate driver IC 37, a 500-th gate bus line GL from the top is driven from both of one end side and the other end side by the gate driver IC 37 and the gate driver IC 38, and a 900-th gate bus line GL is driven from one end side by the gate driver IC 38. In such a way, the gate bus lines GL arranged in the first display region 11 and the gate bus lines GL arranged in the third display region 13 are driven from one end side, and the gate bus lines GL arranged in the second display region 12 are driven from both of one end side and the other end side. In this configuration, a part of the gate driver IC 37 and a part of the gate driver IC 38 constitute the second-type drive circuit unit, and a residual portion of the gate driver IC 37 and a residual portion of the gate driver IC 38 constitute the first-type drive circuit units. According to such a configuration, it becomes unnecessary to perform the case division between the gate one-side drive and the gate both-side drive for each gate driver IC, and the degree of freedom in design is improved. A similar configuration can also be adopted for the source driver 400.

Note that, in this modified example, the first circuit unit is achieved by the gate driver IC 37, and the second circuit unit is achieved by the gate driver IC 38.

<4. Others>

Each of the above-described embodiments has been described by taking the liquid crystal display device as an example; however, a similar configuration can also be adopted for display devices other than the liquid crystal display device. Moreover, each of the above-described embodiments has been described by taking the example where the region in the display unit 100 is logically divided into three regions; however, the number of divided regions in the display unit 100 is not limited to three.

Furthermore, each of the above-described embodiments has been described by taking as an example the case where the shape of the display unit 100 is circular; however, the shape of the display unit 100 is not limited to being circular. Still further, each of the above-described embodiments has been described by taking the example where the ICs are used as drive circuits; however, monolithically mounted drive circuits may be used. Besides, the present invention can be embodied while being modified in various ways within the scope without departing from the spirit thereof.

The invention claimed is:

1. A display device comprising:
   a non-rectangular display unit in which a plurality of scanning signal lines and a plurality of video signal lines are arranged as signal lines;
   a scanning signal line drive circuit configured to drive the plurality of scanning signal lines; and
   a video signal line drive circuit configured to drive the plurality of video signal lines,
   wherein at least one of the scanning signal line drive circuit and the video signal line drive circuit is constituted of a first-type drive circuit unit as a circuit portion configured to drive the signal lines from only one end side, and a second-type drive circuit unit as a pair of circuit portions configured to drive the signal lines from both of one end side and the other end side.

2. The display device according to claim 1, wherein, regarding the signal lines to be driven by a drive circuit constituted of the first-type drive circuit unit and the second-type drive circuit unit, signal lines arranged in a region where a value of a time constant is smaller than a predetermined reference value are driven by the first-type drive circuit unit, and signal lines arranged in a region where the value of the time constant is larger than the reference value are driven by the second-type drive circuit unit.

3. The display device according to claim 1, wherein, regarding the signal lines to be driven by a drive circuit constituted of the first-type drive circuit unit and the second-type drive circuit unit, signal lines shorter than a predetermined reference length are driven by the first-type drive circuit unit, and signal lines longer than the predetermined reference length are driven by the second-type drive circuit unit.

4. The display device according to claim 1, wherein
   at least a first drive unit disposed on one end side of the signal lines, a second drive unit disposed on the same end side of the signal lines, a third drive unit disposed on the other end side of the signal lines, and a fourth drive unit disposed on the same other end side of the signal lines are provided as a drive circuit constituted of the first-type drive circuit unit and the second-type drive circuit unit,
   a part of the first drive unit, the second drive unit, the third drive unit and a part of the fourth drive unit constitute the second-type drive circuit unit,
   a circuit portion, in the first drive unit, not constituting the second-type drive circuit and a circuit portion, in the fourth drive unit, not constituting the second-type drive circuit unit constitute the first-type drive circuit unit, and
   a circuit portion, in the first drive unit, constituting the first-type drive circuit unit and a circuit portion, in the fourth drive unit, constituting the first-type drive circuit unit drive signal lines different from each other.

5. The display device according to claim 1, wherein
   at least a first circuit unit disposed on one end side of the signal lines and a second circuit unit disposed on the other end side of the signal lines are provided as a drive circuit constituted of the first-type drive circuit unit and the second-type drive circuit unit,
   a part of the first circuit unit and a part of the second circuit unit constitute the second-type drive circuit unit,
   a circuit portion, in the first circuit unit, not constituting the second-type drive circuit and a circuit portion, in the second circuit unit, constituting the second-type drive circuit unit constitute the first-type drive circuit unit, and a circuit portion, in the first circuit unit, constituting the first-type drive circuit unit and a circuit portion, in the second circuit unit, constituting the first-type drive circuit unit drive signal lines different from each other.

6. The display device according to claim 1, wherein a shape of the display unit is circular,
a region of the display unit is logically divided into a central region that includes a center of the display unit and two peripheral regions which sandwich the central region therebetween in a direction perpendicular to a direction where the signal lines to be driven by a drive circuit constituted of the first-type drive circuit unit and the second-type drive circuit unit extend, and
regarding the signal lines to be driven by the drive circuit constituted of the first-type drive circuit unit and the second-type drive circuit unit, signal lines arranged in the peripheral regions are driven by the first-type drive circuit unit, and signal lines arranged in the central region are driven by the second-type drive circuit unit.

7. The display device according to claim 1, wherein the scanning signal line drive circuit is constituted of the first-type drive circuit unit and the second-type drive circuit unit.

8. The display device according to claim 1, wherein the video signal line drive circuit is constituted of the first-type drive circuit unit and the second-type drive circuit unit.

9. The display device according to claim 1, wherein each of the scanning signal line drive circuit and the video signal line drive circuit is constituted of the first-type drive circuit unit and the second-type drive circuit unit.

* * * * *